(12) United States Patent
Mukker et al.

(10) Patent No.: US 7,146,463 B2
(45) Date of Patent: Dec. 5, 2006

(54) METHODS AND STRUCTURE FOR OPTIMIZING DISK SPACE UTILIZATION

(75) Inventors: Atul Mukker, Norcross, GA (US); Anuj Kumar Jain, Duluth, GA (US); Hardy Doelfel, Cumming, GA (US)

(73) Assignee: LSI Logic Corporation, Milpitas, CA (US)

( * ) Notice: Subject to any disclaimer, the term of this patent is extended or adjusted under 35 U.S.C. 154(b) by 401 days.

(21) Appl. No.: 10/868,555

(22) Filed: Jun. 15, 2004

(65) Prior Publication Data

US 2005/0278484 A1 Dec. 15, 2005

(51) Int. Cl.
*G06F 12/00* (2006.01)

(52) U.S. Cl. ...................................... 711/114; 711/170
(58) Field of Classification Search .................... None
See application file for complete search history.

(56) References Cited

U.S. PATENT DOCUMENTS 5,651,133 A * 7/1997 Burkes et al. ............... 711/114
6,192,448 B1 * 2/2001 Mansur ....................... 711/112
6,446,156 B1 * 9/2002 Chia et al. ..................... 711/4

* cited by examiner

*Primary Examiner*—Kevin Verbrugge
(74) *Attorney, Agent, or Firm*—Duft Bornsen & Fishman, LLP

(57) ABSTRACT

Methods and associated structure to improve disk capacity utilization in the context of size coercion and COD space reservation techniques applied in a storage system. One aspect hereof provides that the size coercion computations to reduce (round down) the capacity of one or more disk drives in a storage system are performed prior to reservation of disk space for use in configuration-on-disk (COD) techniques. Performing coercion computations and configuration prior to COD space reservation prevents the COD reservation processing from causing un-necessary waste of physical capacity of the coerced disk drives.

15 Claims, 1 Drawing Sheet

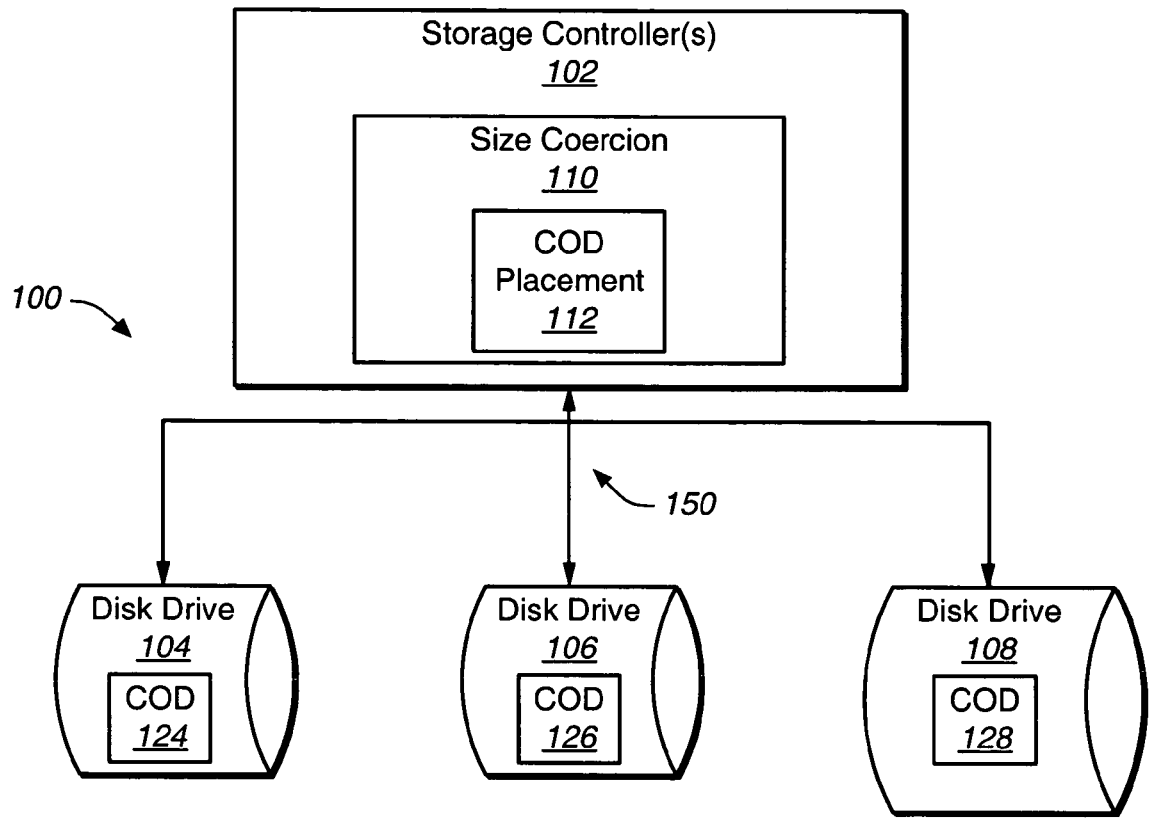
FIG._1
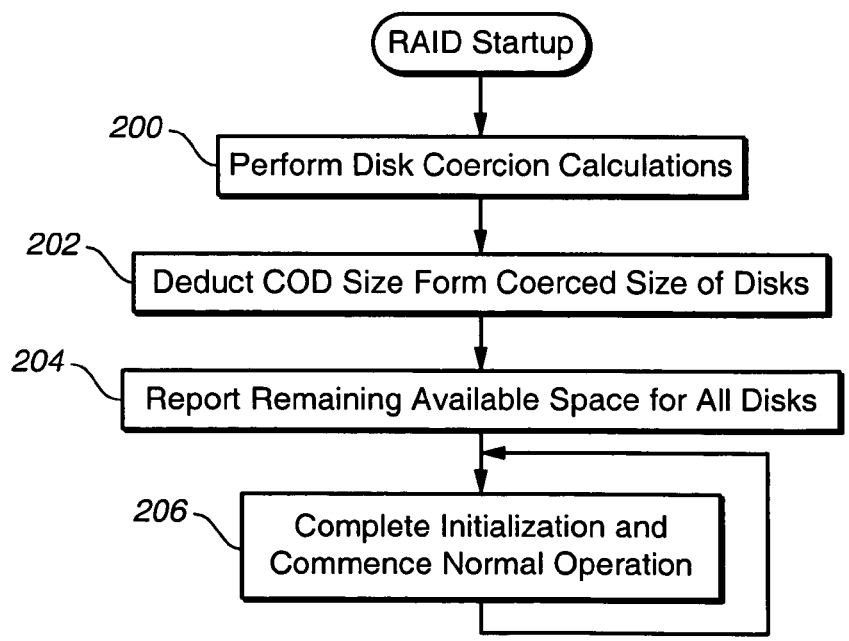
FIG._2

METHODS AND STRUCTURE FOR OPTIMIZING DISK SPACE UTILIZATION

BACKGROUND OF THE INVENTION

1. Field of the Invention

The invention relates generally to storage systems having multiple disk drives and more specifically relates to methods and structures for better utilizing available disk capacity when disk size coercion and disk resident configuration techniques and structures are utilized.

2. Discussion of Related Art

As computing application performance demands have increased, so too have performance and capacity demands on storage systems utilized in conjunction with computing systems. Storage systems such as disk storage system now provide storage capacities of hundreds of gigabytes or terabytes. To improve both performance and reliability, it is common that storage systems provide a plurality of storage devices and storage controllers all operable in parallel and often providing redundancy. Parallel operation of multiple devices within a storage system may improve performance by distributing I/O operations over a plurality of such storage devices operating substantially in parallel. Reliability is improved by providing redundancy of the devices as well as redundant information such that the failure of a particular storage device does not cause failure of the entire system nor loss of data. Rather, continued operation of the storage system may be provided though possibly in a degraded state and any lost data may be recovered from redundant information stored on other storage devices still operating. Such techniques are often referred to as redundant arrays of inexpensive disks or RAID.

Numerous types of RAID storage management are generally known in the art providing varying degrees of redundancy to improve reliability with and without so-called striping to distribute data over a plurality of parallel operating devices.

In the context of such storage systems utilizing a plurality of storage devices operating substantially in parallel and providing redundant storage management techniques, it is common that a storage controller receives host system I/O requests addressing logical blocks of information in the storage system and maps those requests into corresponding physical locations distributed over the multiple devices of the storage system. Such a storage controller is often referred to as a RAID storage controller if it provides redundancy management techniques. In particular when applying redundant storage management techniques in a RAID storage controller, it is common for the storage controller to treat all storage devices used for storing a particular volume or logical unit of data as though they provide some standardized physical capacity. In general, having a standardized, discrete physical capacity on the multiple storage devices used for storing a particular volume or logical unit of data simplifies certain storage and redundancy management techniques. Since such RAID storage systems tend to permit rapid replacement of failed storage devices (i.e., so-called hot swapping), it may be the case that over time replacement devices may vary in their physical capacity relative to earlier, factory installed devices. For example, 80 GB device from one manufacture may have slightly less than 80 GB of available physical storage capacity while an 80 GB drive from a second manufacture may have slightly more than 80 GB physical storage capacity. A storage controller utilizing to such devices may adjust the available capacity of the larger device by logically restricting access to the additional storage capacity. Such a technique is generally known in the art as coercion. The storage controller or RAID storage controller is said to "coerce" the available physical capacity of larger devices to reduce them to the available physical capacity of smaller devices utilized in the same logical unit or volume of data storage. Such coercion generally consists of logical mapping or table structures to adjust the usable space on each device of a storage volume.

Another common technique applied in present-day storage systems is to record configuration information regarding the entire storage system in reserved areas of the devices within the storage system. Storing such configuration information on the storage devices of a storage system may permit more rapid recovery of configuration and mapping information relevant to the storage controller upon initialization of the associated storage system. Such configuration on disk ("COD") techniques may give rise to a need to record tens if not hundreds of megabytes of configuration and mapping information on each device of the storage system. Since such configuration information is useful only for the internal purposes of the storage controller, it is common in the art to further adjust the available physical capacity of each storage device to reduce it by the amount of storage required to store the COD information. Thus, host systems are simply unaware of the area of the disk dedicated by the storage controller to the recording and maintenance of COD information.

A particular problem can arise when size coercion and COD techniques and structures are both applied within the same storage system. Size coercion techniques tend to coerce the size of larger storage devices down to certain discrete size values, for example rounding down to the nearest 10 GB of available storage capacity. Thus, each storage device in the storage system may be coerced to the next lower integral multiple of 10 GB of available storage capacity. Those of ordinary skill in the art will recognize that such coercion techniques may round the storage capacity to any desired value as a matter of design choice. Given that such rounding of the available disk storage capacity is common, problems arise if the COD allocated space is allocated in advance of and independent of the size coercion rounding function.

For example, if a size coercion function is selected to round the capacity down to the next lower integral multiple of 10 GB and if, for example, the COD information is approximately 64 MB of reserved space, the timing and location for the allocated COD information may dramatically affect the coercion features to reduce the available disk drive capacity (i.e., the coercion rounding to a lower available disk capacity). If, for example, an 80 GB storage device is slightly larger than another 80 GB, say for example 20 MB larger, then allocating 64 MB for reserved COD information followed by size coercion rounding to the next lower 10 GB increment would reduce the space of the exemplary storage device to approximately 70 GB wasting a significant portion of 10 GB of available physical space.

It is evident from the above discussion that a need exists for reducing such wasteful practices when combining reserved allocation of COD information with size coercion techniques in a storage system.

SUMMARY OF THE INVENTION

The present invention solves the above and other problems, thereby advancing the state of the useful arts, by providing methods and associated structures for improving disk capacity utilization when coercion and configuration-on-disk techniques are applied in a storage system. Features and aspects hereof help avoid size coercion un-necessarily reducing available disk capacity when COD techniques are also applied to reserve space on each disk drive of a storage system to store system configuration information. One aspect hereof provides that the coercion is performed prior to the space reservation provided for by COD techniques. Thus, reserved disk space used by COD techniques does not un-necessarily cause further reduction of the coerced disk size.

A first feature hereof provides a system comprising: a plurality of storage devices such that each storage device has a corresponding physical storage capacity; and a storage controller coupled to the plurality of storage devices for storing and retrieving information on a volume distributed over the plurality of storage devices, such that the storage controller further comprises: means for coercing the storage capacity of at least one storage device of the plurality of storage devices to determine the total storage capacity of the volume; and means operable in response to completion of coercion by the means for coercing to allocate a reserved area on the at least one storage device of the plurality of storage devices such that the reserved area is inaccessible by any host systems coupled to the storage controller such that the allocation of the reserved area further reduces the total storage capacity of the volume.

Another aspect hereof further provides that the means for coercing is operable to coerce the storage capacity of a subset of the plurality of storage devices.

Another aspect hereof further provides that the reserved area is a configuration-on-disk area that stores configuration information regarding the storage system.

Another aspect hereof further provides that the means for coercing is operable to coerce the storage capacity of the at least one storage device by rounding down the available storage capacity of the at least one storage device to a next lower predetermined discrete increment of storage capacity.

Another aspect hereof further provides that the plurality of storage devices are disk drives.

Another aspect hereof further provides that the storage controller is a RAID storage controller.

Another feature hereof provides a method operable in a storage controller associated with a storage system having a plurality of storage devices to adjust the available storage capacity of the storage system, the method comprising: adjusting the storage capacity of a volume distributed over the plurality of storage devices by coercing the storage capacity of one or more storage devices of the plurality of storage devices; further adjusting the storage capacity of the volume, in response to completion of the adjusting by coercing, by allocating a reserved area on each of the plurality of storage devices; and reporting to an attached host system the adjusted storage capacity resulting from the adjusting and the further adjusting.

Another aspect hereof further provides that the step of adjusting by coercing further comprises: coercing the storage capacity of the one or more storage devices by rounding down the storage capacity of the one or more storage devices to a next lower predetermined discrete increment of storage capacity.

Another aspect hereof further provides that the step of further adjusting further comprises: allocating a configuration-on-disk reserved area on each of the plurality of storage devices such that the configuration-on-disk area is used by the storage controller to store configuration information relating to the storage system.

Another aspect hereof further provides that the plurality of storage devices are disk drives.

Another aspect hereof further provides that the storage controller is a RAID storage controller.

Another feature hereof provides a method for initializing a logical volume in a storage system having a storage controller coupled to a plurality of storage devices, the method comprising: coercing the size of at least one storage device of the plurality of storage devices by selecting a next lower predetermined standardized physical storage capacity; and allocating a reserved area on each storage device of the plurality of storage devices in response to completion of the step of coercing such that the reserved area is not accessible by host systems attached to the storage system.

Another aspect hereof further provides storing configuration information regarding the storage system in the reserved area on each storage device.

Another aspect hereof further provides that the step of coercing further comprises: selecting the next lower predetermined standardized physical storage capacity by rounding the physical storage capacity of the at least one storage device to a next lower predetermined discrete increment of physical storage capacity.

Another aspect hereof further provides reporting to an attached host system a reduced physical capacity for the logical volume reduced by operation of the steps of coercing and allocating.

BRIEF DESCRIPTION OF THE DRAWINGS

FIG. 1 is a block diagram of a system in which features and aspects hereof may be advantageously applied.

FIG. 2 is a flowchart describing a method associated with features and aspects hereof to improve disk capacity utilization.

DETAILED DESCRIPTION OF THE DRAWINGS

FIG. 1 is a block diagram of a storage system 100 having a storage controller (or multiple storage controllers) 102 coupled to a plurality of storage devices 104 through 108. As it is generally known in the art, to enhance reliability and/or performance, multiple storage controllers 102 may be provided operating as redundant backup controllers and/or operating in parallel as multiple active controllers. The disk controllers 102 communicate with storage devices 104 through 108 via communication path 150. As known in the art, communication path 150 may represent multiple, redundant communication paths to further enhance reliability and/or performance of storage system 100. Storage devices 104 through 108 may be disk drives or other well known storage devices such as optical storage devices, tape storage devices, or any other storage devices useful for storing and retrieving information on behalf of host computer systems (not shown) coupled to the storage system 100. As used herein, "storage controller" may be understood as synonymous with "disk controller" as a device that couples to a plurality of storage devices to receive and process I/O requests for attached host system. Further, "storage devices" and "disk drives" may be used synonymously herein but not in a manner to limit the system only to common disk drives. Storage devices may include, as indicated, numerous other types and formats of data storage devices and media.

Functional elements within storage controller 102 control overall operation of storage devices 104 through 106 and provide interaction with attached a host systems (not shown) to receive and process I'll requests therefrom. Storage controller 102 may be, for example, a RAID storage controller to enhance reliability and/or performance of storing and retrieving information on storage devices 104 through 108. Communication path 150 may be, for example, a parallel SCSI bus, Fibre Channel, serial attached SCSI, or any of several other well known protocols and media for exchanging information between this controller 102 and storage devices 104 through 108.

Size coercion element 110 within storage controller 102 is operable to adjust the available total capacity for a volume distributed over the multiple storage devices 104 through 108. The process of size coercion is a generally known in the art as a technique to assure that each of the storage devices 104 through 108 is logically configured to provide a standardized, discrete value physical storage capacity. Such an assurance is useful, in particular, for RAID storage management techniques where data is distributed or striped over a plurality of disk drives to enhance performance of the storage system and where the data includes redundancy information useful to enhance reliability of the storage system 100. Implementation of RAID storage management techniques is dramatically simplified if each storage device 104 through 108 used for such striping or distribution of data and redundancy information provides a standardized, discrete storage capacity. The plurality of storage devices 104 through 108 often may originally provide identical storage capacities when the storage system 100 is manufactured. However, over time, replacement of storage devices 104 through 108 in response to failures or capacity upgrades may lead to a variety of storage capacities for the storage devices within storage system 100.

By way of example, if it is desired to use multiples of 10 GB storage capacity as a standardized discrete capacity and if storage device 108 has a non-standard storage capacity such as, for example, 80.5 GB, size coercion element 110 may be operable to round down the available storage capacity of storage device 108 to 80 GB to provide a standardized discrete disk size. A logical volume of data and associated redundancy information distributed over storage devices 104 through 108 may therefore be more easily managed by the storage controller by assuming that each of the storage devices within the logical volume provides a standardized, discrete storage capacity.

Configuration-on-disk (COD) placement element 112 is operable to further adjust the capacity of a volume distributed over storage devices 104 through 108 by allocating a reserved area on each of the storage devices 104 through 108 for storage of configuration information regarding the storage system 100. COD 124 represents such configuration information on storage device 104. In like manner, COD 126 represents such configuration information on storage device 106 and COD 128 represents such configuration information stored on storage device 108.

In accordance with features and aspects hereof, COD placement element 112 is operable following completion of operation of size coercion element 110. Thus, allocation/reservation of a COD reserved area on each storage device will not force un-necessary further reduction of available storage capacity by the size coercion element 110. Were it otherwise as presently practiced in the art (i.e., COD placement element 112 first reserves a portion of each of storage devices 104 through 108 and then size coercion element 110 coerces the size of one or more of the storage devices), the coercion feature would possibly un-necessarily further reduce the available storage capacity for one or more of the storage devices. By forcing allocation and placement of the COD (reserved area) on each storage device following the coercion operation, the potential for such un-necessary size reduction through operation of the coercion operation is reduced.

Those of ordinary skill in the art will recognize that numerous additional functions and features are provided within storage controllers 102 in addition to the indicated size coercion 110 and COD placement 112. Further, those of ordinary skill in the art will recognize that the coercion element 110 and COD placement element 112 may be organized in any desired hierarchical or peer relationships between one another and between other functional aspects of the controller 102. The indicated hierarchical relationship is merely intended as suggestive of the desired ordering in accordance with features and aspects hereof wherein size coercion is performed before COD placement features. Further, those of ordinary skill in the art will recognize that the indicated functions within controller 102 may be implemented as suitably programmed instructions fetched from an appropriate memory device and executed by an appropriate general or special purpose processor, or may be implemented as suitably designed custom hardware (e.g., electronic circuits) alone or in conjunction with appropriate general or special purpose processors.

FIG. 2 is a flowchart describing an exemplary method in accordance with features and aspects hereof. During initialization or startup of the storage controller (e.g., a RAID storage controller), element 200 may be operable to perform desired storage device computations and calculations to determine an appropriate size and storage capacity to be utilized for each of a plurality of storage devices within the storage system. As noted above, when RAID storage management techniques are applied, a standardized common size for all storage devices involved in a RAID volume may significantly simplify RAID storage management techniques. Element 200 therefore represents all processing necessary to adjust the size of one or more storage devices in a storage system to provide a common maximum storage capacity for each storage device utilized for a particular RAID storage volume. Those of ordinary skill in the art will recognize that the calculations and adjustments may be performed as simple logical and arithmetic computations such that the actual physical size of the storage devices need not be altered. Rather, a logical size used to report back to attached host systems may be determined and computed. The size so determined may be reported to an attached host system and/or stored in any appropriate nonvolatile memory associated with the storage controller performing method. The configuration information is preferably stored on each storage device of the storage system as discussed above and further discussed below.

Having so coerced a common maximum storage size for each storage device associated with a storage volume, element 202 is then operable to further adjust the available storage capacity of each storage device by subtracting out an appropriate storage capacity corresponding to the size of configuration information to be stored on disk. As noted above, it is common practice to store configuration information relating to the entire storage system on each storage device within the storage system. The storage devices therefore provide the desired nonvolatile storage media for storing configuration related information associated with the storage controller, the storage devices, and logical configuration information associated with one or more volumes or logical units stored within the storage system. In accordance with features and aspects hereof, the COD reserved area allocation is preferably performed following the size coercion operations discussed above with respect to element

200. By so performing the COD adjustments corresponding to reserving an area of each storage device for storing of configuration information, excessive waste in coercing storage device capacity may be better avoided. Techniques presently practiced in the art normally reduce the available storage capacity of each storage device by first allocating the reserved area for configuration information and then performing the size coercion operations based on the reduced remaining storage capacity of each storage device. Performing the COD space allocation and then coercion as presently known risks unnecessary reduction of total storage capacity in the size coercion operation.

Having so adjusted the size by coercion and further adjusted the storage capacity of the storage devices by reserving an area for the COD, element 204 may then report to an attached host system, as required, supplying the adjusted total storage capacity of the plurality of storage devices. Element 206 and then represents any required further processing to complete initialization and then the commencement of normal operation of the storage controller.

Those of ordinary skill in the art will recognize that although depicted as an initialization or startup process, the method of FIG. 2 may also be invoked in response to detected changes in the configuration of a storage system. As noted above, most present-day storage systems (especially RAID storage systems) permit real time reconfiguration of the storage system by hot swapping of devices. Where such hot swapping of storage devices may result in a change of configuration of the system, various initialization and re-initialization sequences may be invoked by the storage controller including, for example, the method of FIG. 2 to again perform size coercion and COD reserved area allocation adjustments.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system comprising:
   a plurality of storage devices wherein each storage device has a corresponding physical storage capacity; and
   a storage controller coupled to the plurality of storage devices for storing and retrieving information on a volume distributed over the plurality of storage devices, wherein the storage controller further comprises:
      means for coercing the storage capacity of at least one storage device of the plurality of storage devices to determine the total storage capacity of the volume; and
      means operable in response to completion of coercion by the means for coercing to allocate a reserved area on said at least one storage device of the plurality of storage devices wherein the reserved area is inaccessible to any host systems coupled to the storage controller such that the allocation of the reserved area further reduces the total storage capacity of the volume.

2. The system of claim 1 wherein the means for coercing is operable to coerce the storage capacity of a subset of the plurality of storage devices.

3. The system of claim 1 wherein the reserved area is a configuration-on-disk area that stores configuration information regarding the storage system.

4. The system of claim 1 wherein the means for coercing is operable to coerce the storage capacity of said at least one storage device by rounding down the available storage capacity of the at least one storage device to a next lower predetermined discrete increment of storage capacity.

5. The system of claim 1 wherein the plurality of storage devices are disk drives.

6. The system of claim 1 wherein the storage controller is a RAID storage controller.

7. A method operable in a storage controller associated with a storage system having a plurality of storage devices to adjust the available storage capacity of the storage system, the method comprising:
   adjusting the storage capacity of a volume distributed over the plurality of storage devices by coercing the storage capacity of one or more storage devices of the plurality of storage devices;
   further adjusting the storage capacity of said volume, in response to completion of the adjusting by coercing, by allocating a reserved area on each of the plurality of storage devices; and
   reporting to an attached host system the adjusted storage capacity resulting from the adjusting and the further adjusting.

8. The method of claim 7 wherein the step of adjusting by coercing further comprises:
   coercing the storage capacity of said one or more storage devices by rounding down the storage capacity of said one or more storage devices to a next lower predetermined discrete increment of storage capacity.

9. The method of claim 7 wherein the step of further adjusting further comprises:
   allocating a configuration-on-disk reserved area on each of said plurality of storage devices wherein the configuration-on-disk area is used by the storage controller to store configuration information relating to the storage system.

10. The method of claim 7 wherein the plurality of storage devices are disk drives.

11. The method of claim 7 wherein the storage controller is a RAID storage controller.

12. A method for initializing a logical volume in a storage system having a storage controller coupled to a plurality of storage devices, the method comprising:
   coercing the size of at least one storage device of the plurality of storage devices by selecting a next lower predetermined standardized physical storage capacity; and
   allocating a reserved area on each storage device of the plurality of storage devices in response to completion of the step of coercing wherein the reserved area is not accessible by host systems attached to the storage system.

13. The method of claim 12 further comprising:
   storing configuration information regarding the storage system in the reserved area on said each storage device.

14. The method of claim 12 wherein the step of coercing further comprises:

selecting said next lower predetermined standardized physical storage capacity by rounding the physical storage capacity of said at least one storage device to a next lower predetermined discrete increment of physical storage capacity.

15. The method of claim 12 further comprising:

reporting to an attached host system a reduced physical capacity for the logical volume reduced by operation of the steps of coercing and allocating.

* * * * *